COMPATIBLE COLOR TELEVISION RECEIVER

Filed Oct. 14, 1954

INVENTOR
FREDERIK WILLEM DE VRIJER
BY Fred M. Vogel
AGENT

United States Patent Office 2,803,698

Patented Aug. 20, 1957

2,803,698

COMPATIBLE COLOR TELEVISION RECEIVER

Frederik Willem de Vrijer, Eindhoven, Netherlands, assignor, by mesne assignments, to North American Philips Company, Inc., New York, N. Y., a corporation of Delaware

Application October 14, 1954, Serial No. 462,269

5 Claims. (Cl. 178—5.4)

In color television, the reproduction of a scene in colors, which are as far as possible natural, requires at the receiver end the provision of television images in at least two but preferably in three primary colors. These television images are produced either by means of one picture tube capable of producing light in all the primary colors used or with the aid of more picture tubes each of which produces light of one or of part of the primary colors used; in the latter case the television images produced by each of the picture tubes have to be united by optical means.

The invention relates to a color television receiver comprising at least two picture tubes. In three-color television use is, for example, made of three picture tubes each of which produces light of one of the primary colors, for example, red, blue and green. A requirement which a color receiver generally has to satisfy is that of compatibility, in that not only a colored image must be reproduced when desired but also the receiver must be able to reproduce a black-and-white image in order to enable the user to view the program even if a transmitter transmits a signal relating only to a black-and-white image.

It has already been proposed to design a receiver such that in the case of a black-and-white transmission the television signal is supplied at correct intensity to all three picture tubes each of which reproduces the black-and-white signal in one of the primary colors which together give the impression of a black-and-white image. However, in practice it is difficult to obtain a really satisfactory black-and-white image in this manner. The three picture tubes generally will not have exactly identical characteristic curves; the frames traced out by the electron beams on the three screens will not be identical either in relation to position or in relation to time; and the optical superposition of the three images, each entirely defined, presents great difficulty. Comparatively slight discrepancies, for example, frames which are not exactly identical, cause lack of definition of the black-and-white image and in addition the image produced is not truly black-and-white but comprises larger or smaller colored parts. The difference of the characteristic curves has a similar effect. In the reproduction of a color transmission these factors are not equally significant. In this case the tolerances are wider, since the color acts as an additional information and slight differences between the required and actually occurring intensity of the electron beams cause only a substantially imperceptible shifting of colors. At any rate, experience has shown that a color receiver which produces a very satisfactory colored image usually produces a poor black-and-white image.

It is an object of the invention to adapt such a receiver to the reproduction of a black-and-white television signal having a quality completely identical to that of a normal black-and-white receiver, and the invention is characterized in that one of the picture tubes is provided with a screen comprising phosphorus luminescing in white and a filter arranged in front of this screen which allows that primary color to pass which is not supplied by the other picture tubes, and in that this filter can be removed when a black-and-white signal is to be received, the other picture tubes being rendered inoperative simultaneously.

The invention will now be explained with reference to the accompanying drawing, in which three embodiments of a receiver in accordance with the invention are shown by way of example:

Figures 1, 2, 3:
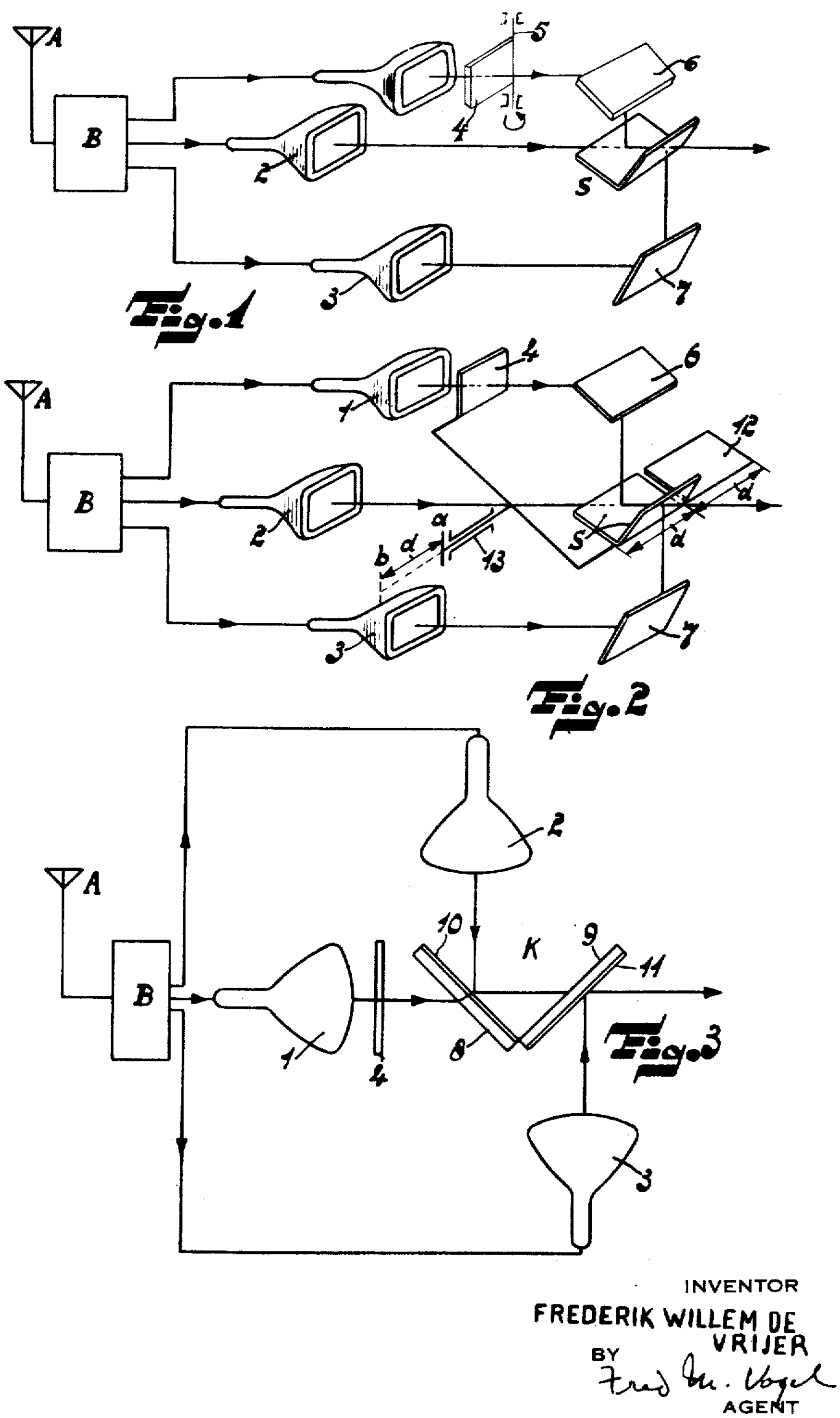
Fig. 1 shows one embodiment of the invention.
Figs. 2 and 3 show alternative embodiments.

Referring now to Fig. 1, a receiver antenna A receives the signal transmitted by a known kind of color transmitter and supplies it to a part B of the receiver, which part converts the received signals into three color-representative video signals which are supplied to picture tubes 1, 2 and 3. Naturally the transmitter and receiver must be able to cooperate. For example, if the transmitter transmits a signal consisting of a carrier wave having a signal of large bandwidth (the brilliance signal) modulated on it, one sideband being partly rejected, and of an auxiliary carrier wave situated within the sideband which is not rejected and consisting of two components the phase of which is displaced by $\pi/2$ radians and each having a signal of small bandwith (the color signals) modulated on it, the part B must, among other things, be able to generate the two components of the auxiliary carrier wave at a correct phase relation to the components of the auxiliary carrier wave generated by the transmitter in order to detect the two signals of small bandwidth and, if required, to produce linear combinations of the signal of large bandwidth and the two signals of small badwidth. The last-mentioned process may also be effected in the picture tubes themselves, for example, by supplying the signal of large bandwidth to one grid of the picture tube and one or both signals of small bandwidth to another grid.

One of the picture tubes, in the Figure the tube 1, is provided with a phosphor luminescing in white instead of with a phosphor luminescing in a definite primary color; in front of the screen of the picture tube 1 a filter 4 is arranged which passes from the white light only that primary color which is not supplied by the picture tubes 2 and 3. The three images produced by the three picture tubes are united into one image by optical means, for example, by means of a system of semi-permeable mirrors S.

If now a program is to be viewed which is transmitted by a black-and-white transmitter, the receiver is adjusted to black-and-white reception; however, the video-signal is not supplied to all three picture tubes but according to the invention only to the picture tube 1 comprising the phosphor luminescing in white, while at the same time the filter 4 is removed from the light path of this tube. For this purpose the filter 4 may, for example, be arranged so as to be able to pivot about a shaft 5. Thus, it is removed by rotating the shaft 5 and, as the case may be, this is done simultaneously with the adjustment of the receiver to black-and-white reception. Consequently, the apparatus reproduces a black-and-white image while the disadvantages produced when the black-and-white video-signal is supplied to all three picture tubes are completely avoided.

In the receiver shown in Fig. 1, it is assumed that the optical superposition of the partial images supplied by the three picture tubes is effected without the use of completely reflective mirrors and is effected with the aid of a system of semi-permeable or color selective mirrors. As is well-known, the use of semi-permeable mirrors has a limitation in that the optical superposition involves appreciable luminous losses. When a color transmission is to be reproduced these losses are not very important, since the intensity of the image finally reproduced is determined by three picture tubes so that it still has sufficient luminous intensity; however, if a black-and-white transmission is to be reproduced, the intensity is determined by one picture tube only and the luminous losses in the semi-permeable mirrors are not compensated for by other picture tubes. In spite of the fact that the luminous losses are not very important when using semi-permeable mirrors, for the reproduction of a color transmission use is preferably made of color-selective mirrors or other color-selective means which act to unite the partial images optically, not only because these color-selective means have the advantage that these losses are kept to a minimum but also because these color-selective means may correct the color of the light emitted from the picture tubes. However, if a program is to be followed which is transmitted by a black-and-white transmitter, and if the filter is removed from in front of the picture tube provided with the white phosphor; if the black-and-white television signal is supplied to the picture tube provided with the white phosphor, and if the other picture tubes are rendered inoperative, the color-selective means will only pass a part of the light spectrum emitted from the picture tube provided with the white phosphor, with the result that not only an image is produced of poor luminous intensity but also an image which is not black-and-white but is reproduced in a definite color.

The invention obviates these disadvantages and is characterized by the further feature that in order to receive a black-and-white television signal the means which may or may not be color-selective and which act to unite the partial images optically and are arranged in the path of light of the picture tube provided with the white phosphorus, are rendered inoperative, the said path of light being, if required, restored by means of non-color-selective means.

Fig. 2 is a diagram of a further embodiment of a color receiver according to the invention. This receiver is substantially identical to the one shown in Fig. 1. Like elements are designated correspondingly. In this case, however, in order to receive a black-and-white signal the system of semi-permeable mirrors S is also removed from the path of light of the picture tube 1 in order to avoid luminous losses produced by this system. However, in the embodiment shown this cannot be done without further expedients; in order to restore the initial path of light the system S is replaced by a completely reflecting mirror 12. The removal of the filter 4 and of the system S and the substitution for this system S by the mirror 12 may, for example, be effected by means connected so that these parts are rigidly interconnected and moved together over a support 13 by a distance *d* from the position *a* to the position *b*. This displacement may, if desired, be effected simultaneously with the adjustment of the receiver to black-and-white reception. It should be noted that, if the picture tube 3 were to be provided with a phosphor luminescing in white and with a filter 4, only the right-hand part of the system S would have to be substituted by a mirror 12 for black-and-white reception.

Fig. 3 is a diagram of another embodiment of a color receiver according to the invention in which the system of semi-permeable mirrors S is substituted for by a system of color-selective mirrors K. This system may, for example, be built up from two plane parallel transparent plates 8 and 9 coated with thin layers 10 and 11 which effect the color splitting. Such a layer may, for example, consist of one or more layers of transparent dielectric material, while its thickness should be in a definite relation to the wavelengths of the parts of the light spectrum to be passed and to be reflected. The layer 10 may, for example, reflect red light and pass blue and green light; the layer 11 may reflect blue light and pass red and green light. The plates 8 and 9 act as supports for this color-splitting material, and are naturally required to be transparent and usually consist of glass. It will be obvious that with the given properties of the color-splitting layers 10 and 11 the picture tube 1 provided with the filter 4 is required to supply the green partial image, the picture tube 2 the red one and the picture tube 3 the blue one. If now for the reception of a black-and-white television signal the color filter 4 is removed and the black-and-white video signal is supplied to the picture tube 1 without further expedients, the plates, 8 and 9 only pass the green parts of the light spectrum produced by the picture tube 1 provided with the white phosphor with the result that not only appreciable luminous losses occur but also that an image is produced which is not black-and-white as required but colored green. According to the invention in this case the system of color-selective mirrors K is removed from the path of light of the picture tube 1 if a black-and-white signal is to be received.

The arrangement shown in Fig. 3 is such that for the reception of a black-and-white signal only the filter 4 and the system K have to be removed from the path of light of the picture tube 1 provided with the white phosphor without the system K being required to be substituted by a completely reflecting mirror, as is the case in the embodiment shown in Fig. 2. In this embodiment also the filter 4 and the system K may be rigidly interconnected and removed together from the path of light of the picture tube 1.

It should be noted that, if use is made of color-selective means in order to unite the partial images optically, these color-selective means may also be used as a filter so that a separate filter 4 can be dispensed with.

It will be obvious that the invention can also be used in a two-color system in which consequently only two picture tubes are used.

It is also possible to apply the invention to a three-color system in which two picture tubes are combined to form one two-color tube. In this event the other picture tube must naturally be provided with a phosphor luminescing in white and a removable filter.

The invention has been described with reference to a receiver in which direct-vision tubes are used. Obviously projection tubes may also be used. This has the advantage that the filter may be appreciably smaller and consequently can be more readily removed.

While preferred embodiments of the invention have been shown and described, other embodiments and modifications thereof will occur to those skilled in the art and will fall within the scope of invention as defined in the following claims.

What is claimed is:

1. A compatible color television receiver comprising at least two picture tubes including one producing a black-and-white image alone when excited, the remaining said tubes producing images in a primary color when excited, a movable filter mounted in front of said one tube and converting said black-and-white image into an image in a primary color other than the primary color images produced by said remaining tubes, optical means positioned to optically unite the images on said tubes, means for exciting all of said picture tubes to produce a color image with said optical means, and means for selectively providing black-and-white television comprising first means for moving said filter away from its position in front of said one tube and second means for exciting only said one tube and not exciting said remaining tubes, whereby the black-and-white image on said one tube may be directly viewed.

2. A receiver as set forth in claim 1 wherein said one tube includes a phosphor producing white light when excited, and said remaining tubes include phosphors luminescing in different primary colors when excited.

3. A receiver as set forth in claim 1 wherein the optical means includes a color-selective mirror interposed in the light path of said one tube and coupled to the selective means.

4. A receiver as set forth in claim 3 wherein the selective means comprises a reflecting mirror and third means for replacing the color-selective mirror with the reflecting mirror.

5. A receiver as set forth in claim 1 wherein the filter comprises a color-selective mirror.

References Cited in the file of this patent

UNITED STATES PATENTS 2,466,021 Goldmark -------------- Apr. 5, 1949

UNITED STATES PATENT OFFICE

CERTIFICATE OF CORRECTION

Patent No. 2,803,698 August 20, 1957

Frederik Willem de Vrijer

It is hereby certified that error appears in the printed specification of the above numbered patent requiring correction and that the said Letters Patent should read as corrected below.

In the heading to the printed specification, between lines 7 and 8, insert -- Claims priority, Netherlands October 20, 1953.

Signed and sealed this 7th day of January 1958.

(SEAL)
Attest:
KARL H. AXLINE

Attesting Officer

ROBERT C. WATSON
Commissioner of Patents